F. M. RYAN.
INDICATOR FOR THE STEERING WHEEL OF AN AUTOMOBILE.
APPLICATION FILED AUG. 13, 1917.
1,323,914. Patented Dec. 2, 1919.
Fig. 1.
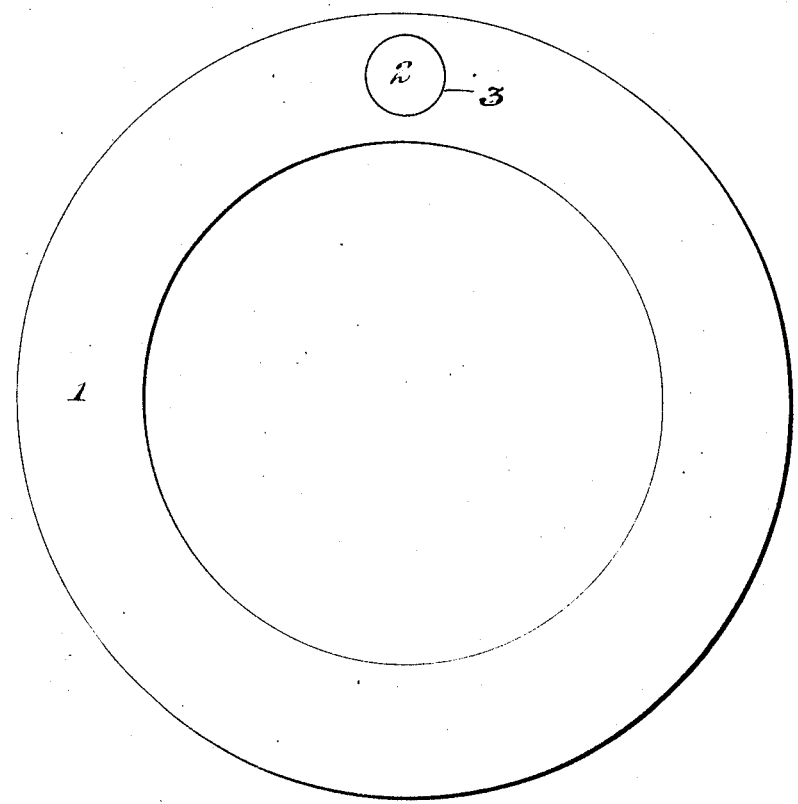
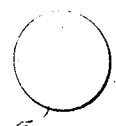 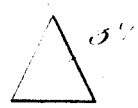 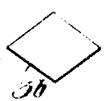  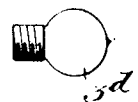
Fig. 2.  Fig. 3.  Fig. 4.  Fig. 5.  Fig. 6.
Frank M. Ryan, Inventor.
Witnesses.

UNITED STATES PATENT OFFICE.

FRANK M. RYAN, OF PHOENIX, ARIZONA.

INDICATOR FOR THE STEERING-WHEEL OF AN AUTOMOBILE.

1,323,914.   Specification of Letters Patent.   Patented Dec. 2, 1919.

Application filed August 13, 1917. Serial No. 186,018.

*To all whom it may concern:*

Be it known that I, FRANK M. RYAN, a citizen of the United States, residing at Phoenix, in the county of Maricopa and State of Arizona, have invented a new and useful Indicator for the Steering-Wheels of Automobiles, of which the following is a specification, reference being had to the accompanying drawing.

My invention relates to a contrivance, herein known as an indicator for the steering-wheel of the automobile, and made a part of the steering wheel rim, the material and finish of the indicator being such as the experience and judgment of the manufacturer may deem best.

Automobilists frequently find it difficult to ascertain the exact position of the steering-wheels of their machine in starting such machine or extricating it from garages, parkings, etc. A driver, particularly a novice, because of obstructing fenders and other parts of his car, is quite often compelled to maneuver more or less in beginning progress either forward or backward; to shift from his position behind the steering-wheel to learn the angular position or alinement of the steering-wheels; or to question bystanders or others for such information. These difficulties and others are overcome by the above mentioned and hereinafter described invention. This indicator, by revealing the position of the front wheels, enables the driver to better combat heavy sand or mud.

Many other situations make the use of this indicator desirable that the autoist may know by the sense of touch or sight the alinement of the steering-wheels of his machine.

I obtain the above mentioned objects by the contrivances illustrated in the accompanying drawing in which, Figure 1 is a plan of the rim of a steering wheel of an automobile.

Figs. 2, 3, 4, 5 and 6 are plans of various marks which may be used. Figs. 3, 4, 5 and 6 being modifications of the mark shown in Fig. 2.

The steering wheel rim 1 may be of any of the usual constructions. The indicator or mark 3 is to be mounted upon the steering wheel rim 1 at the point 2. The indicator 3 is preferably a piece of metal which may be attached to the rim with tacks, or which may be embedded into the rim. The point upon the steering wheel rim at which the indicator 3 is to be attached is found by placing the front steering wheels of the automobile in line with the rear wheels, so that the automobile will run straight ahead or straight backwardly, and then placing the indicator 3 at the top or forward side of the wheel in line with the steering wheel post. Then when the steering wheel is operated, or is to be operated, the position of the indicator upon the steering wheel rim will indicate to the operator the position of the steering wheels of the automobile, that is the front traction wheels. If desired the indicator might be placed at the rear side of the steering wheel rim or in any position which will indicate to the operator the normal position of the steering wheel and the position of the steering traction wheels by the position of the indicator upon the rim.

The modified forms $3^a$, $3^b$, $3^c$, and $3^d$ shown in Figs. 3, 4, 5 and 6 and similar forms may be substituted for the form shown in Fig. 2.

The structure embodying this invention is shown in the accompanying drawing but it is understood that various changes and modifications can be made without deviating from the general principles and spirit of the invention.

Having thus described my invention, what I claim and desire to secure by Letters Patent is:

1. An indicator for the steering wheel of an automobile comprising a mark located upon the steering wheel rim and adapted to indicate the normal position of the steering wheel as when going straight ahead or straight backwardly, and adapted to indicate the positions of the steering traction wheels by the position of the mark upon the steering wheel rim.

2. An indicator for the steering wheel of an automobile comprising a mark upon the steering wheel rim accurately located to indicate the positions of the steering traction wheels by the position of the mark.

FRANK M. RYAN.